March 9, 1971  R. P. CANALE  3,568,439
TURBINE ENGINE FUEL CONTROL
Filed July 24, 1968  3 Sheets-Sheet 1
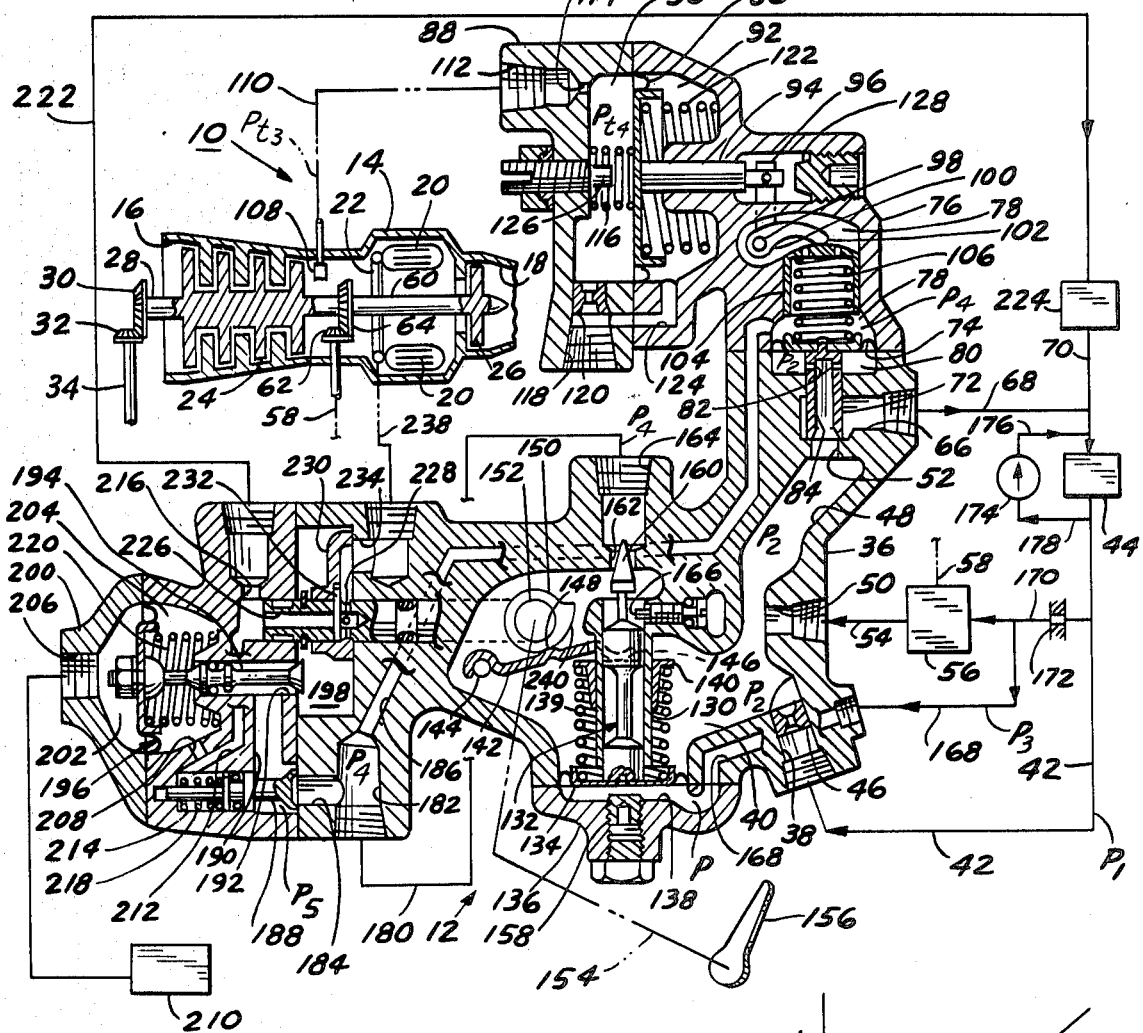
FIG. 1
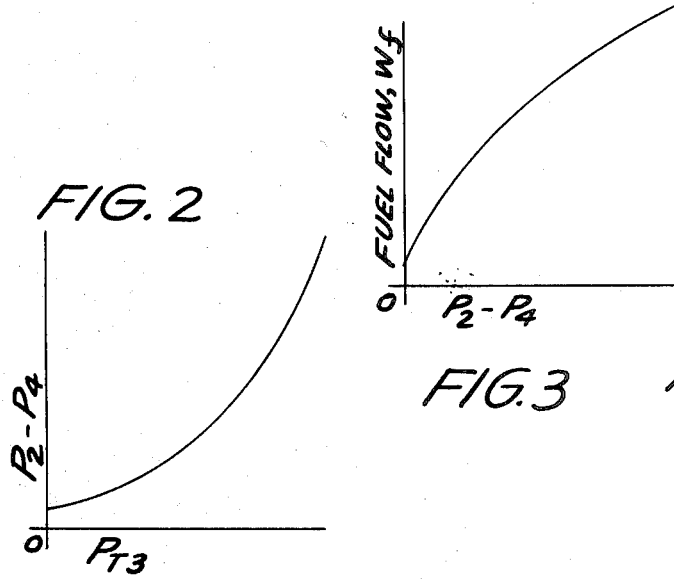
FIG. 2
FIG. 3
FIG. 4
RAYMOND P. CANALE
INVENTOR
BY Walter Potoroka, Jr.
ATTORNEY

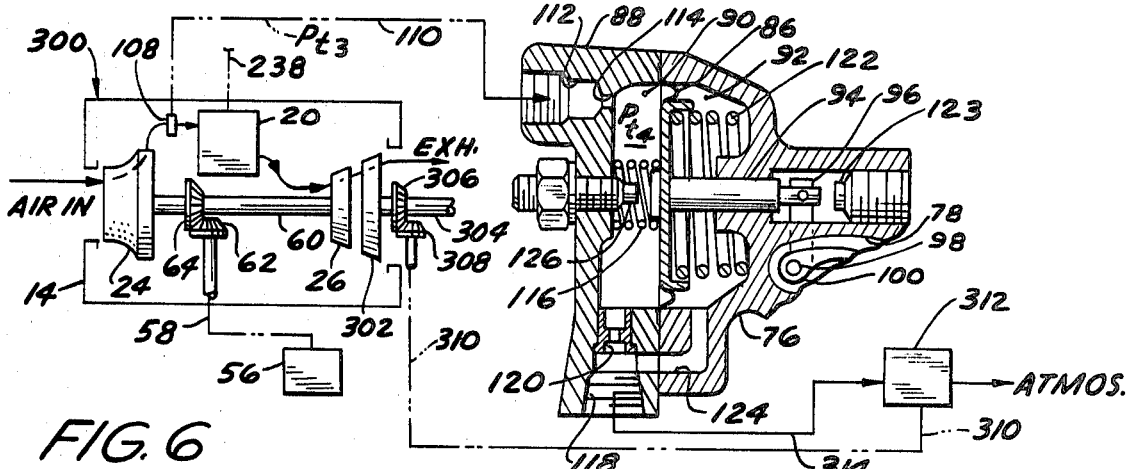
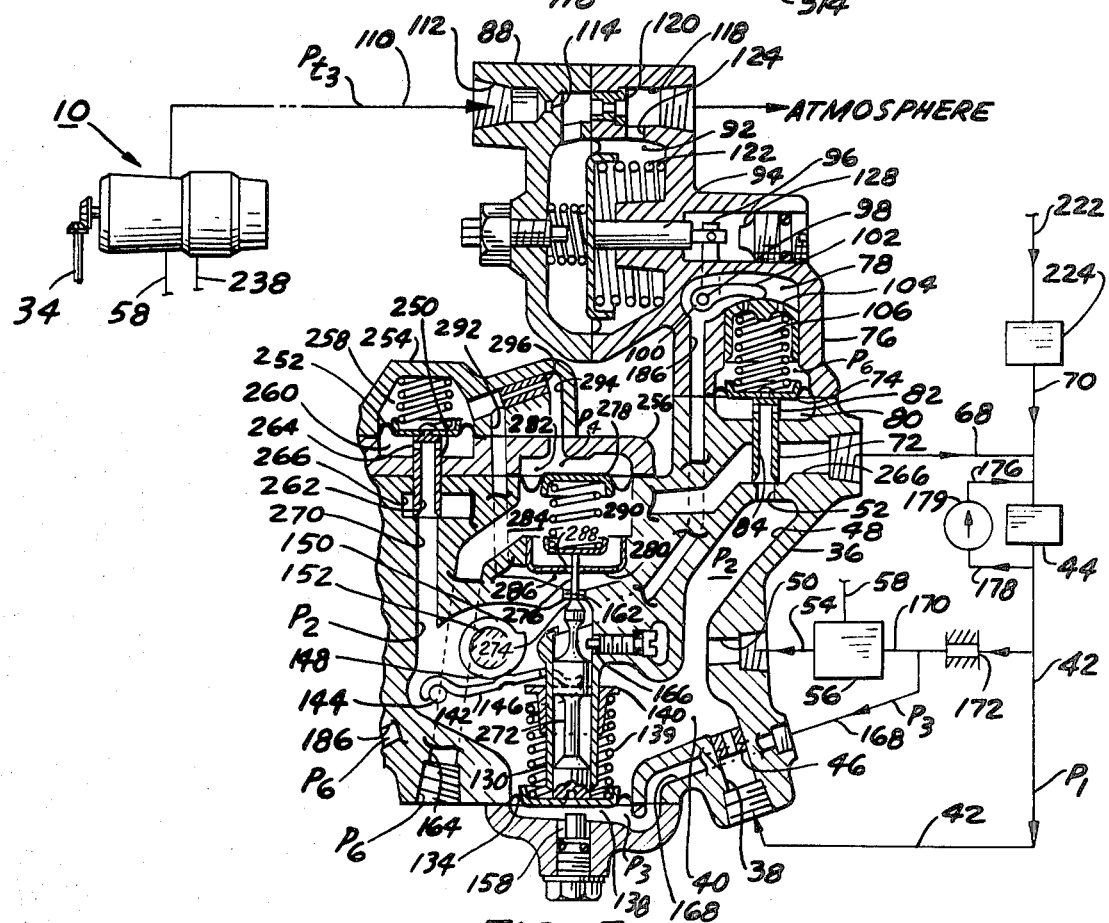
FIG. 6
FIG. 5
RAYMOND P. CANALE
INVENTOR
BY Walter Patoroha, Jr.
ATTORNEY March 9, 1971 R. P. CANALE 3,568,439
TURBINE ENGINE FUEL CONTROL
Filed July 24, 1968 3 Sheets-Sheet 3
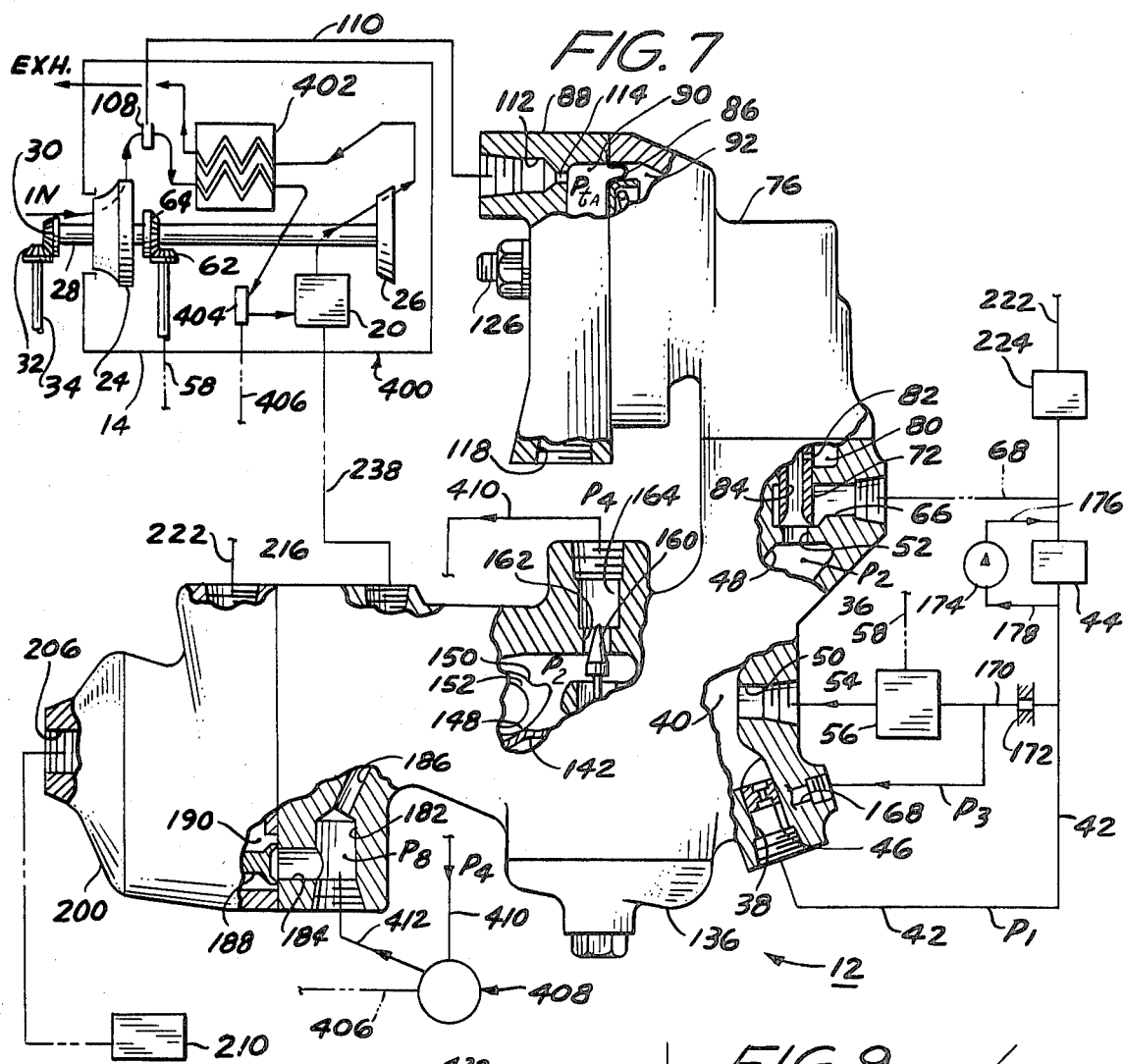
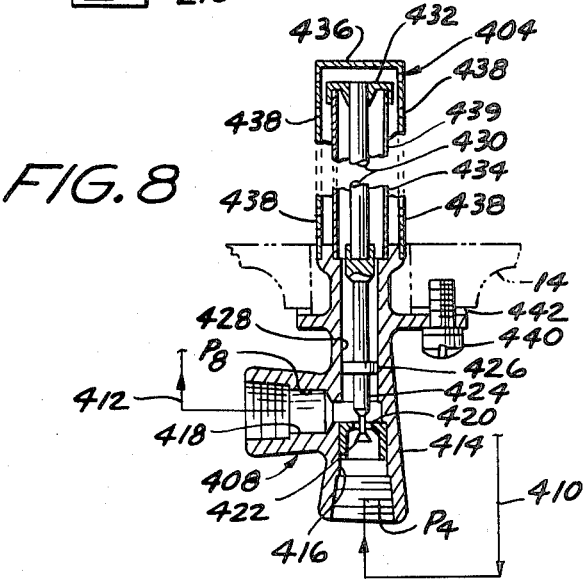
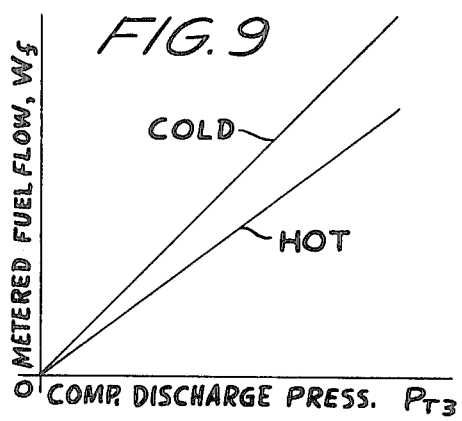
RAYMOND P. CANALE
INVENTOR
BY Walter Patoraka, Jr.
ATTORNEY United States Patent Office 3,568,439
Patented Mar. 9, 1971

3,568,439
TURBINE ENGINE FUEL CONTROL
Raymond P. Canale, Warren, Mich., assignor to
Holley Carburetor Company, Warren, Mich.
Filed July 24, 1968, Ser. No. 747,366
Int. Cl. F02c 9/10
U.S. Cl. 60—39.28                                   11 Claims

ABSTRACT OF THE DISCLOSURE

A turbine engine fuel control is provided with a fuel inlet, metering-type governor valve assembly responsive to signals generated in response to engine speed and indicia of operator power request, fuel bypass valving means for returning unmetered fuel from the fuel control to an associated fuel supply system, compressor discharge pressure sensing means for tending to further close the bypass valving means as compressor discharge pressure increases and pressure responsive means responsive to the differential in pressures which meter the fuel for opening said bypass valving means in order to achieve a rate of metered fuel flow corresponding to compressor discharge pressure.

BACKGROUND OF THE INVENTION

Gas turbine engines may be classified broadly into three groups such as (1) turbojet, (2) turboprop and (3) turboshaft. The turbojet engine is one which relies upon jet thrust to develop its propulsive force, whereas, a turboprop has its turbine shaft coupled to a propeller, as well as to the compressor, so as to develop its propulsive force by slightly increasing the velocity of a large mass of air. The turboshaft engine differs from the turboprop in that the turbine shaft is coupled to an output shaft which drives something other than a propeller. This output shaft may, for example, be a drive shaft for a land based vehicle such as a truck, or a stationary power plant.

Each of these engines, although identical in many basic concepts, in the past required different types of fuel controls. That is, the fuel controls were often required to include specific components which were uniquely suited for sensing and responding to single operating parameters in order to, in turn, contribute to the total control of the fuel metering function.

Further, in the past, fuel controls which were to have a fuel metering schedule which provided for a substantially linear metered fuel flow with respect to compressor discharge pressure usually required complicated and costly valves, linkages and levers.

SUMMARY OF THE INVENTION

The present invention comprises generally a fuel control for a turbine engine having a housing, a fuel inlet, a bypass fuel outlet controlled by a bypass valve, compressor discharge pressure sensing means, a fuel metering governor valve, means responsive to and effective for creating an operating signal in accordance with the speed of the turbine engine, and means for creating an operating input signal indicative of the operator request for power output of said turbine engine, wherein said governor valve is responsive to forces created by said power request input signal and said speed signal for metering fuel to said turbine engine in accordance therewith, wherein said bypass valve is responsive to a first force indicative of said compressor discharge pressure and a second opposed force indicative of a pressure differential existing across the metering governor valve, wherein said first force normally tends to seat said bypass valve to close said bypass fuel outlet as during periods of engine acceleration, and wherein said second opposed force tends to unseat said bypass valve in order to open said bypass fuel outlet as during periods of steady state engine operation.

Accordingly, it is now proposed to provide a fuel control of a concept which can be readily adapted to a turboprop, turboshaft or turbojet engine without the necessity of any major rework with the possible exception of minor changes in the constants and calibration of the system.

Another main object of this invention is to provide, for a turbine engine, a fuel control which is capable of metering a substantially linear schedule of fuel flow with respect to compressor discharge pressure without the necessity of including therein complicated and costly components for either sensing or reacting to operating control parameters.

Another object of this invention is to provide, in a fuel control as set forth above, means for providing isochronous governing characteristics therein.

A further object of this invention is to provide within a fuel control a main metering valve across which a pressure differential is created and which pressure is applied to a fuel bypass valve for at times opening the bypass valve when governed engine operation is experienced.

Other more specific objects and advantages of this invention will become apparent when reference is made to the following description considered in conjunction with the drawings.

DESCRIPTION OF THE DRAWINGS

In the accompanying drawings, wherein certain details may be omitted from one or more views for purposes of clarity;

FIG. 1 is a schematic illustration in cross-section of a fuel control embodying the invention as might be employed with a schematically typical solid shaft turbine engine which might be of either the turbojet or turboshaft variety;

FIGS. 2, 3 and 4 are graphs illustrating characteristic performance relationships of various operating control parameters;

FIG. 5 is a schematic illustration in cross-section of a second embodiment of the invention wherein isochronous governing characteristics are achieved;

FIG. 6 illustrates, by a fragmentary portion in cross-section, a modification of the invention as disclosed by either of FIG. 1 or 5;

FIG. 7 is a schematic illustration, partly in cross-section, of a second modification of the invention as disclosed by either of FIGS. 1, 5 or 6;

FIG. 8 is an enlarged cross-sectional view of certain elements schematically illustrated in FIG. 7; and FIG. 9 is a graph illustrating a characteristic relationship between metered fuel flow and compressor discharge pressure of the modification of FIG. 7.

DESCRIPTION OF PREFERRED EMBODIMENTS

Referring now in greater detail to the drawings, FIG. 1 illustrates a turbine engine 10 whose fuel supply is controlled by the scheduling type of fuel control 12 embodying the invention. The engine 10 has a housing 14 with an air intake 16 and exhaust nozzle 18. A combustion or burner chamber 20 having a fuel distribution ring 22 herein, is located within the housing 14 between the compressor 24 and turbine 26. Power plant 10 is of the "solid shaft" type which has its compressor 24 connected as by a solid shaft to all of the turbine wheels or turbine wheel 26. The output power of such an arrangement as shown by engine 10 may be achieved by a pure jet output, as is often the case in aircraft applications, or, for example, by a mechanical transmission as schematically depicted by shaft 28, gears 30, 32 and output shaft 34. Turbine engine 10, of course, could be employed as a land-based stationary power plant, one employed in combination with either a land or water vehicle, as well as being employed as an aircraft power plant.

The fuel control 12, having a housing 36, is illustrated as comprising a fuel inlet conduit 38 which communicates generally between a general cavity or chamber 40 within housing 36 and a fuel supply conduit 42 communicating with a fuel pump 44. As illustrated at 46, the inlet conduit 38, is provided with a restriction the purpose of which will become apparent as the description progresses.

Cavity or chamber 40 communicates with a passageway 48 which, in turn, communicates with conduits 50 and 52. Conduit 50 communicates, as by conduit means 54, with speed sense means 56 operatively connected as by suitable motion transmission means 58 to the shaft 60 as by means of meshed gears 62 and 64 of which 64 is connected to the shaft 60 and compressor 24 for rotation therewith.

Conduit 52 is in controlled communication with a bypass conduit 66 leading, as by suitable conduit means 68, to conduit means 70 upstream of the fuel pump 44. A bypass valve 72 operatively connected to a pressure responsive diaphragm assembly 74 is normally resiliently urged downwardly toward a position closing communication between conduits 52 and 66. Diaphragm assembly 74 may be suitably retained between housing 36 and housing portion 76 so as to form two generally distinct but variable chambers 78 and 80. As will be noted, bypass valve 72 is provided with a plurality of radial passages 82 which continually complete communication between the interior 84 of bypass valve 72 and chamber 80.

A second diaphragm assembly 86 suitably secured between housing portion 76 and a cooperating cover member 88, so as to form two generally distinct but variable chambers 90 and 92, is operatively connected to a motion transmitting rod 94 slidably received in housing portion 76. Rod 94 is operatively connected to one end of a lever 96 which, in turn, is secured to a transverse shaft 98 extending, in sealed relationship, through a wall of chamber 78. A second lever 100, also secured to shaft 98, is generally contained within chamber 78 in a manner so as to have end 102 thereof in abutting engagement with a movable spring cup or spring seat 104. A spring 106 contained generally between spring seat 104 and diaphragm assembly 74 functions to transmit forces and/or motion therebetween. As can be seen as rod 94 is moved to the right by the action of diaphragm assembly 86, lever 96 and shaft 98 rotate clockwise causing corresponding rotation of lever 100 which causes spring seat 104 to move downwardly increasing the loading on spring 106.

Burner inlet pressure, $P_{t3}$, sensed as by a probe 108 is directed to chamber 90 as by conduit means 110 and 112 and a restriction 114 in series therewith. Chamber 90, containing a compression spring 116, normally urging diaphragm assembly 86 to the right, communicates with the ambient atmosphere by means of a conduit 118 which also contains a restriction 120. Because of the flow afforded by the combination of restrictions 114 and 120 the pressure, $P_{t4}$, within chamber 90, although related to the value of $P_{t3}$, will be of a value somewhat less than the value of $P_{t3}$. Chamber 92, containing a compression spring 122 normally urging diaphragm assembly 86 to the left, communicates with the ambient atmosphere as by means of a conduit 124 which communicates with conduit 118 at the atmosphere side of restriction 120. Threadably adjustable stop members 126 and 128 are provided in order to limit the movement of the diaphragm assembly to respectively the left and right.

In chamber or cavity 40 is a cylindrical valve-guide portion 130 for slidably receiving therein a governor valve 132 suitably secured as at one end to a third pressure responsive diaphragm assembly 134 which may be suitably secured between housing 36 and cover member 136 in a manner forming a chamber 138 between the diaphragm assembly 134 and cover 136. A flanged sleeve-like variably positioned spring seat 140 is situated generally about the cylindrical valve-guide 130 in a manner so as to contain a compression spring 139 between seat 140 and diaphragm assembly 134. A lever 142, generally hinged as at 144, has a bifurcated end 146 which is adapted to straddle guide 130 in order to engage the upper surface of spring seat 140. Intermediate the ends thereof, lever 142 is provided with a cam-follower portion 148 adapted to engage the cam surface of a cam member 150 mounted on a shaft 152 for rotation therewith. As diagrammatically illustrated at 154, shaft 152 is operatively connected to a power selector lever 156 so that, for example, clockwise rotation of power lever 156 will cause corresponding rotation of shaft 152 and cam 150 thereby rotating lever 142 clockwise about pivot 144 in order to urge spring seat 140 downwardly thereby increasing the loading of compression spring 139. Such loading of spring 139, of course, urges diaphragm assembly 134 and governor valve 132, connected thereto, in the downward direction. A threadably adjustable stop 158 may be provided for limiting the degree of downward movement of diaphragm assembly 134 and governor valve 132.

Governor valve 132 is provided with a valving portion 160 which is adapted to cooperate with an orifice 162 in order to control the rate of fuel flow from chamber 40 to a conduit 164. As is apparent, the higher that valve 132 is positioned, the less flow there will be through orifice 162 for the same pressure differential. An adjustably positioned eccentric stop member 166 may be provided in order to provide a positive limit for the upward movement of governor valve 132.

Chamber 138, on the other side of diaphragm assembly 134, communicates as by a conduit 168 with a conduit 170 which communicates generally between speed sense 56 and fuel supply conduit 42. As will be noted, conduit 170 contains a restriction 172 and conduit 168 communicates with conduit 170 at a point downstream of restriction 172.

The purpose of speed sense 56, in the embodiment disclosed, is to provide a pressure signal indicative of the speed of the gas producer section (compressor 24 and compressor drive turbine). One embodiment of the invention was successfully tested and operated employing a speed sense functionally equivalent to the speed sense as shown, for example, at "140" in U.S. Pat. 3,073,115 issued Jan. 15, 1963 to Warren H. Cowles et al. In such an arrangement, restriction of 172 would be functionally equivalent to the restriction shown at 242 of said U.S. Pat. 3,073,115. Such arrangements and their operations are at this time generally well known in the art. It might also be pointed out at this time that pump 44 is provided with either an externally or internally formed pressure relief and check valve assembly as shown at 174 with suitable associated conduitry 176 and 178 communicating with valve 174 and respectively with conduits 70 and 42.

Conduit 164 supplies metered fuel, as by suitable conduit means 180, to a conduit 182 which, in turn, communicates such fuel at the metered pressure to branch conduits 184 and 186. Conduit 184 supplies fuel, past a pressurizing valve 188, to a passage 190 which is, in turn, in continuous communication with a cylindrical passageway 192. On the other hand, branch conduit 186 communicates the pressure of such metered fuel to chamber 78 on one side of diaphragm assembly 74.

A valve 194, slidably situated in cylindrical passageway 192, has one end suitably secured to a fourth pressure responsive diaphragm assembly 196 and its other end provided with a valving surface positioned so as to control the degree of communication permitted from passageway 192 to a chamber 198. Diaphragm assembly 196 is suitably secured between housing 36 and cooperating cover member 200 in a manner so as to define two generally distinct but variable chambers 202 and 204 respectively communicating with conduits 206 and 208. Conduit 206 is adapted for communication with a booster air pump 210 while conduit 208 communicates with a conduit 212 having one end in communication with a chamber 214, slidably receiving pressurizing valve 188, and its other end communicating with a chamber 216. Chamber 214, in addition to valve 188, contains a compression spring 218 which normally urges valve 188 toward the right to the closed position. Chamber 204 also contains a compression spring 220 which normally urges diaphragm assembly 196 to the left so as to move valve 194, connected thereto, toward the closed position. Chamber 216 communicates, as by suitable conduitry 222, with fuel tank or reservoir 224.

Shaft 152, extending in sealed relationship from chamber 40, and through chamber 198, has its end provided with an internally formed axially extending passageway 226 communicating between chamber 216 and a plurality of conduits 228 formed generally radially in shaft 152. A lever-like valve member 230, mounted on shaft 152 and secured thereto as by a drive pin 232 for rotation therewith is adapted, as illustrated, to at times cover, in a sealing manner, a conduit 234 so as to preclude communication between conduit 234 and chamber 198. Conduit 234, in turn, communicates with a conduit 236 which, through suitable conduit means 238, is adapted to communicate fuel flow to the fuel burner ring 22. Whenever valve 230 is in the position illustrated, closing communication between conduit 234 and chamber 198, radial conduits 228, in shaft 152, provide for a degree of communication between conduit 234, conduit 226 and chamber 216.

OPERATION

Fuel at a pressure $P_1$ is supplied by pump 44 through conduit 42 to conduit 38 and through a muscles restriction 46 situated within conduit 38. An accompanying drop in pressure across restriction 46 results in the fuel within chamber 40 being at some pressure $P_2$ which is less than $P_1$. Further, it can be seen that conduit 168 supplies fuel from conduit 170 to chamber 138 at a pressure $P_3$ which is usually less than $P_1$. However, it should be apparent that as the speed sense 56 senses greater speeds, the throttling valve contained therein becomes more nearly closed, resulting in the differential pressure $P_3-P_2$ increasing in magnitude. The ultimate maximum value of pressure $P_3$ would, of course, be pressure $P_1$ upstream of restriction 172. A further pressure drop occurs with the passage of fuel through the aperture defined by orifice 162 and metering valve 160 so that metered fuel downstream of orifice 162 is at a pressure $P_4$. An inspection of FIG. 1 will disclose that a pressure differential of $P_2-P_4$ exists across the metering orifice 162 and that the same pressure differential of $P_2-P_4$ exists across the diaphragm assembly 74. In other words, the force tending to open the bypass valve 72 is directly related to the pressure differential across the metering orifice 162 as determined by the governor valving element 160.

Further, it can be seen that a pressure differential of $P_3-P_2$ exists across pressure responsive diaphragm assembly 134. Accordingly, as pressure differential $P_3-P_2$ increases and approaches the value of $P_1-P_2$, as, for example, by the increased rotational speed of speed sense 56, a force is created across diaphragm assembly 134 tending to move governor valve 132 upwardly toward a more nearly fully closed position.

When engine 10 is not operating, fuel pump 44 will also be shut down, spring 220 will urge diaphragm assembly 196 and valve 194 to the left closing communication between conduit 192 and chamber 198, spring 218 will move pressurizing valve 188 to the right terminating communication between conduits 184 and 190, spring 106 will urge bypass valve 72 downwardly against its cooperating seat thereby closing communication between orifice 52 and conduit 66, and power selector lever 156 will have been rotated generally to the position illustrated thereby rotating the shut-off valve 230 to the position shown whereby free communication between chamber 198 and conduit 234 is terminated. As a consequence of such rotation of the power selector lever 156, cam 150 is rotated generally to the position shown thereby permitting spring 139 to urge spring seat 140 upwardly and rotate lever 142 counter-clockwise against the cam 150. At this time, of course, diaphragm assembly 134 would usually be against the maximum stop 158.

When the engine is being made ready for cranking, the power selector lever 156 is rotated to the desired power setting causing rotation of shaft 152 which, in turn, rotates cam 150 clockwise and rotation of shut-off valve 230 to permit communication between conduit 234 and chamber 198. Such rotation of cam 150 causes the contoured surface 240 to engage follower 148 and progressively urge lever 142 clockwise about pivot 144 thereby increasing the loading on spring 139 so as to urge diaphragm assembly 134 and governor valve 132 downwardly so as to provide a maximum effective flow area through orifice 162. As the engine 10 is being cranked, the booster air pump 210 provides a quantity of air under pressure through conduit 206 to chamber 202 so as to force, against the resistance of spring 220, diaphragm assembly 196 and valve 194 which is attached thereto, to the right completing the communication between conduit 192 and chamber 198. At the same time fuel pump 44 provides a supply of fuel through conduit 42 to chamber 40 at a pressure $P_2$, which increases in magnitude as the pump speed increases, so as to flow through orifice 162, conduits 164, 180 and 184. When pressure $P_2$ increases sufficiently to begin to overcome the preload force of spring 218, pressurizing valve 188 is forced to at least a partly opened position thereby permitting fuel to flow through conduits 190 and 192, at a pressure $P_5$ which is lower than $P_4$, into chamber 198 and subsequently through conduits 234 and 238 to the engine fuel distribution ring 22 to the engine burner chambers 20. At this early stage of engine cranking or starting, the fuel pressure $P_2$ will not be sufficient to cause diaphragm assembly 74 to move upwardly against spring 106 in order to open the bypass valve 72.

Once ignition is achieved, the engine compressor 24 and turbine 26 begin to accelerate to achieve the speed and/or power requested by the position of the power selector lever 156. As a consequence of the increase in speed, fuel flow from pump 44 is increased with attendant increases in pressures $P_1$, $P_2$ and $P_3$ within supply conduit 42 and chambers 40 and 138, respectively. Accordingly, it can be seen that the pressure differential of $P_3-P_2$ is increasing at diaphragm assembly 134 tending to overcome the force of spring 139 so as to urge governor valve 132 upwardly while, at the same time, the metering differential across orifice 162, which is also increasing, is being applied across diaphragm assembly 74 tending to move bypass valve 72 upward in the opening direction.

Generally, compressor discharge pressure, $P_{t3}$, varies as the square of the speed of the compressor 24; the speed signal, $P_3$, varies as the square of the speed being sensed; and the weight-rate of fuel flow, $W_f$, through orifice 162 varies as the square root of the pressure differential $P_2-P_4$. It should also be pointed out that the flow-through system established by restrictions 114 and 120 permits the changing of pressure $P_{t4}$ from having a characteristic of varying as the square of the speed of the compressor to a lesser relationship, as, for example, approximating the square root of the compressor discharge pressure, $P_{t3}$, permitting the ultimate relationship of fuel flow, $W_f$, varying linearly with respect to compressor discharge pressure, $P_{t3}$. This can be expressed by the equation:

$$W_f = KA\sqrt{P_2 - P_4}$$

where:

K = a constant
A = cross-sectional flow area of orifice 162 as determined by valving portion 160

Further, this is graphically illustrated by FIGS. 2, 3 and 4 which, respectively, illustrate the relationship between the differential pressure $P_2 - P_4 (\Delta P_1)$ and compressor discharge pressure, $P_{t3}$; metered fuel flow, $W_f$, and differential pressure $\Delta P_1$; and metered fuel flow, $W_f$, and compressor discharge pressure $P_{t3}$.

As engine speed (compressor speed) increases, pressure within respective chambers 90, 80, 40 and 138 also increases in accordance with the parameters governing such pressures. Accordingly, it can be seen that as compressor speed is increasing, speed sense differential pressure $P_3 - P_2$ causes the gradual upward movement of governor valve 132 when the force of spring 139 is overcome, thereby reducing the effective cross-sectional area of orifice 162. Due to the decreased cross-sectional area of orifice 162, the pressure differential $P_2 - P_4$ or $\Delta P$, tends to increase, causing a greater upward force to be applied to bypass valve diaphragm assembly 74. Accordingly, when $\Delta P_1$ increases to a predetermined value (for the conditions established) the resulting upward force on diaphragm assembly 74 equals and then to a slight degree exceeds the force of spring 106 on diaphragm assembly 74 so as to open bypass valve 72 in order to bypass fuel from chamber 48, and conduit 52 to the inlet side of the fuel pump 44 as by conduit means 66, 68 and 70. Bypass valve 72 will be moved toward and away from the closed position in order to maintain the particular pressure differential $\Delta P$, so as to keep the engine operating at the governed steady state condition.

If it is now assumed that it is desired to increase the output of the engine from some first point of steady state operation to a second point of steady state operation, the only thing that need to be done is to rotate the power selector lever 156 further to the right in order to cause an additional incremental clockwise rotation of shaft 152 and cam 150 so as to have the cam surface 240 further depress lever end 146 of lever 142. This, in turn, causes a greater loading on spring 139 and diaphragm assembly 134 to the point that the force created by pressure differential $P_3 - P_2$ or $\Delta P_2$ is overcome thereby moving governor valve 132 downwardly increasing the effective flow area of orifice 162.

As a consequence, increased fuel flow to the engine is achieved resulting in increases in the compressor speed, compressor discharge pressure, $P_{t3}$, compressor pressure, $P_{t4}$, and speed sense differential pressure $P_3 - P_2$. The increase in $P_{t4}$ causes diaphragm assembly 86 to further load spring 106 thereby overcoming $\Delta P_1$ across diaphragm assembly 74 and tending to close the bypass valve 72 and maintain $\Delta P_1$ in proportion to $P_{t4}$. Accordingly, as before, when pressure differential $P_3 - P_2$ increases sufficiently, governor valve 132 is moved upwardly an amount sufficient to meter the desired weight rate of fuel flow and bypass valve 72 is moved upwardly so as to maintain the desired $\Delta P_1$ across the metering orifice 162.

For a controlled deceleration, the power selector lever 156 is rotated to a lower counterclockwise position thereby permitting end 146 of lever 142 to move to its uppermost position. This reduces the load on spring 139 and permits $P_3 - P_2$ to move governor valve 132 to its uppermost position so as to, for example, engage the minimum fuel flow abutment or stop 166. At the full counter-clockwise position of lever 156, shaft 152 is rotated so as to cause the positive shut-off valve 230 to be rotated to the position shown thereby terminating further fuel flow from chamber 198 to conduits 234 and 238. Radial conduits 228 and axial conduit 226 cooperate to permit fuel to drain, during shut-down, from the engine, through conduit 222, to the tank or reservoir 224.

In view of the preceding, it should be apparent that speed sense 56 provides an overrun protection. That is, if for some reason the load, as experienced by shaft 34, was suddenly removed, the engine would tend to overspeed and depending on the magnitude of the lost load, such overspeed could be critical. Accordingly, it can be seen that any such tendency to overspeed is sensed by speed sense 56, which, in turn, creates a related increase in the differential pressure $P_3 - P_2$ so as to move the governor valve upwardly thereby reducing the fuel flow to the engine so as to prevent an otherwise uncontrolled overspeed.

A second embodiment of the invention is disclosed in FIG. 5; all elements in FIG. 5 which are like or similar to those of FIG. 1 are designated by like reference numbers. It should also be pointed out that for reasons of clarity, and space requirements, the portion of the fuel control generally to the left of pivot 144 in FIG. 1 is not reproduced in FIG. 5. However, in view of the detailed description of the embodiment of FIG. 1 it is apparent that if the various features embodied within the omitted portion are desired, it becomes a simple matter of connecting the "broken" end of conduit 186 of FIG. 5 to conduit 182 of FIG. 1 as shown therein and providing the remaining attendant structure.

The embodiment of FIG. 5, however, primarily concerns itself with the provision of a reset mechanism for the governor valve spring 139 in order to achieve isochronous governor characteristics.

In the embodiment of FIG. 5, a second bypass valve 250 is provided and connected at one end to a pressure responsive diaphragm assembly 252 which is retained generally between a cover member 254 and a housing portion 256 in a manner defining two generally distinct but variable chambers 258 and 260. The inner passageway 262 of bypass valve 250 is in communication with chamber 260 as by means of a plurality of radially formed conduit portions 264. As will be noted, the conduit 66 of FIG. 1 is replaced by a longer conduit 266 which not only surrounds bypass valve 72 but also surrounds bypass valve 250. A compression spring 268 in chamber 258 continually urges bypass valve 250 downwardly toward its seat to close communication between a conduit 270, communicating with chamber 40, and bypass conduit 266.

A governor valve 272, similar to governor valve 132 of FIG. 1, is provided with a valving or metering element 274 adapted for cooperation with metering orifice 162. Governor valve 272 also has an extension 276 projecting beyond orifice 162 and into a second general chamber formed as by housing 36 and housing portion 256. A pressure responsive diaphragm assembly 278, generally retained between housing portion 256 and housing 36, and a cup-like insert 280, suitably fixed in position, cooperate to define three distinct chambers 282, 284 and 286. A reset orifice 288, formed in cup-like member 280, accommodates the free passage therethrough of governor extension 276. Governor extension 276 is of substantially constant cross-sectional area; therefore, regardless of the axial position or movement of governor valve 272, the same effective area exists as between the orifice 288 and extension 276.

A first spring cup, comprising a portion of the pressure responsive diaphragm assembly 278 and a second spring cup which may be fixedly secured to the extension 276 in any suitable manner, cooperate to contain a compression spring 290 therebetween and within chamber 284. A conduit 292 is in free communication with both chambers 258 and 286 while a second conduit 294 communicates between chambers 258 and 282 contains a restriction 296 therein.

From an inspection of FIG. 5, it can be seen that chambers 260, 40 and 80 are at a pressure $P_2$, while chambers 286, 258 and 282 are at a pressure $P_4$ which is the "metered" pressure and less than pressure $P_2$ upstream of orifice 162. Chambers 258 and 282 are, of course, dead chambers; accordingly, restriction 296 is provided in conduit 294 in order to tailor the responsiveness of diaphragm assembly 278 by controlling the flow of fuel through the use of restriction 296.

Chamber 284, downstream of reset orifice 288 is at a pressure $P_6$ which is less than $P_4$ because of the pressure drop across reset orifice 288. The pressure differential of $P_6 - P_4$ will always be a function of fuel flow because the effective area of reset orifice 288 is constant regardless of the position of governor valve 272.

Assuming now that the engine is operating at some first point in steady state and acceleration to some second point is desired, power selector lever 156, shaft 152 and cam 150 are rotated to the power setting desired causing lever 142 to load spring 139 and thereby force governor valve 272 downwardly against maximum stop 158 so as to open metering orifice 162 to its maximum effective area. As a result, an increase in fuel flow is experienced through orifice 162 and through reset orifice 288 into chamber 284 and through conduit 164, communicating therewith, conduits 180, 184, 190, 192, 198, 234 and 238 (FIG. 1) to the fuel ring within the engine 10. The increased fuel flow causes acceleration of compressor 24 with an attendant increase in $P_{t3}$ and $P_{t4}$. Such an increase in compressor discharge pressure is communicated, as a force, to diaphragm assembly 74 overcoming the force of the differential pressure $P_2 - P_6$ and closing bypass valve 72.

Bypass valve 250 is also maintained closed during such acceleration because of the decrease in the magnitude of $P_2 - P_4$ which is communicated to chamber 258. Pressure $P_4$ increases in magnitude because of the governor valve being in a somewhat wide-open position thereby increasing the effective flow area of orifice 162 and consequently reducing the pressure drop thereacross. Consequently, even though pressure $P_2$ in chamber 260 is greater than pressure $P_4$ in chamber 258, the value of $P_4$ when added to the preload of spring 268 is sufficient to maintain the bypass valve 250 closed.

Further, pressure $P_4$ in chamber 286, downstream of metering orifice 162, is communicated via conduit 294 to chamber 282. Accordingly, a pressure differential of $P_4 - P_6$ is established across the diaphragm assembly between chambers 282 and 284 creating a force downwardly directed against spring 290 and governor valve 272 tending to keep the governor valve in its maximum fuel flow position. This, in effect, creates a force, in addition to the loading of spring 139, tending to move the governor valve towards its wide open position.

When the speed sense 56 approaches the selected engine speed, pressure $P_3$ has increased sufficiently in chamber 138 to start an upward movement of governor valve 272. As the valving portion 274 more closely approaches cooperating orifice 162, the pressure differential across orifice 162 increases by having pressure $P_4$ reduced in magnitude. Consequently, the differential of $P_2 - P_4$ across diaphragm assembly 252 is now sufficient to move bypass valve 250 toward the open direction thereby bypassing fuel from conduit 270 through conduit 266 and to the inlet side of pump 44. It should be noted that the pressure differential across metering orifice 162 is the same pressure differential across diaphragm assembly 252 of bypass valve 250. Therefore, the position of bypass valve 250 will be continually adjusted in order to maintain a substantially constant pressure differential across orifice 162 during governed steady state operation.

It should also be apparent that the reduction in magnitude of $P_4$ causes a decided reduction in the downward force created by the pressure differential across the diaphragm created by the pressure differential across the diaphragm assembly between chambers 282 and 284. Therefore, it can be seen that not only is $P_3$ increasing at the time of approaching governed operation but that one of the forces created by $P_4 - P_6$ is decreasing. Consequently almost instantaneous or isochronous governed operation is achieved whenever the selected engine speed is attained.

The operation of bypass valve 72 is, of course, the same as described with reference to FIG. 1. Here, it will be noted, the pressure differential of $P_2 - P_6$ is that as exists across both the metering orifice 162 and reset orifice 288.

Of course, the acceleration curves as depicted in FIGS. 2, 3 and 4 apply equally well to the embodiment of FIG. 5.

Before describing the other modifications and embodiments of the invention, it should be mentioned that the shut-off valve 230, pressurizing valve 188 and valve 194 do not constitute an essential portion of the fuel control as far as the metering function of the fuel control is concerned. Accordingly, it is conceivable that in practicing the invention, valves 194 and 230 along with their associated control structures could be dispensed with, if, their particular features were not desired.

FIG. 6 illustrates, to the degree necessary, the manner in which the invention as disclosed by either FIG. 1 or FIG. 5 may be modified, in order to enable the use of the invention in combination with a split-shaft turbine engine. Only a fragmentary portion of the fuel control is shown since the entire fuel control could be either as described and disclosed in FIG. 6 which are like or similar to those of either FIGS. 1 or 5 are identified with like reference numbers.

A split shaft turbine engine 300 is schematically illustrated as being comprised of a suitable housing 14 containing therein a radial compressor 24 operatively connected as by a shaft 60 to a first stage rotor or compressor turbine 26. A power turbine 302, situated generally coaxially with said compressor turbine 26 and mounted on an engine output shaft 304, is adapted to drive some load through any cooperating power transmission means. Gears 306 and 308, of which gear 306 is operatively connected to shaft 304 for rotation therewith, cooperate to drive, as by motion transmitting means 310, a second speed sense 312. The speed sense 312 may be functionally equivalent to speed sense 56. That is, it may be comprised of a centrifugally positioned throttling valve which, as speed increases, further restricts the flow of fluid, whether liquid or gas, past such throttling valve.

In the arrangement illustrated by FIG. 6, the secondary speed sense 312, driven in relation to the speed of output shaft 304, has its input connected as by a conduit 314 to the output or exhaust conduit 118 must pass generally through the centrifugally positioned throttling valve of the speed sense assembly 312.

Accordingly, if, for example, the engine 300 is operating at steady state conditions and the load on output shaft 304 is suddenly removed, the power turbine 302 would immediately overspeed. It is for this purpose, namely to limit the degree of such possible overspeed to a value below that which would be structurally critical, that the secondary speed sense 312 is provided. This is achieved in the following manner.

As the power turbine 302 starts to overspeed, the speed is transmitted via 310 to speed sense 312. During this time the compressor discharge pressure is being communicated to chamber 90. However, as the speed of the power turbine increases toward its designed critical speed, speed sense 312, at some predetermined speed, causes its throttling valve to restrict the flow out of exhaust conduit 118 to a degree sufficient to cause the pressure within chamber 90 to be communicated via restriction 120, conduit 118 and conduit 124 to chamber 92 thereby in effect equalizing the pressure within chambers 90 and 92. Consequently, spring 122 is permitted to move diaphragm assembly 86 to the left against stop 126 and thereby effectively reduce the loading on spring 106 (FIG. 1 or 5) so as to permit bypass valve 72 to become fully opened. This, in turn, results in a drastic reduction in metered fuel flow to the engine which reduces the gas generator speed and power turbine speed to within safe limits.

FIG. 7 illustrates another modified form of the invention wherein another control parameter is employed, that being the parameter of burner inlet temperature, for further qualifying the metered fuel flow to the engine. All elements in FIG. 7 which are like or similar to either FIG. 1 or FIG. 5 are identified with like reference numbers.

In FIG. 7, a regenerative type turbine engine 400 is illustrated as comprising a housing 14 containing therein a compressor 24 and turbine 26 each mounted on a shaft 60 which also carries a drive gear 64 meshed with a driven gear 62 for driving speed sense 56 as by motion transmitting means 58. A second set of gears 30 and 32 driven by a shaft 28, as in FIG. 1, may be employed for driving a related load. A compressor discharge pressure sensing probe 108 communicates, as by conduit means 110, with conduit 112.

A regenerator or heat-exchanger 402 is located generally intermediate the compressor 24 and burner 20. As is well known, the exhaust gases from turbine 26 are directed to the regenerator 402, before passing to atmosphere, and a substantial portion of the heat contained by such gases is transferred to the air which is passing from the compressor 24 and through another portion of the regenerator 402 thereby increasing the efficiency of the engine in terms of shaft horsepower per pound of fuel.

Further, a temperature probe 404 is situated generally between the regenerator 402 and the burner 20 so as to sense the temperature of the air at that point in order to further tailor the fuel requirements in accordance therewith. The temperature probe 404 is operatively connected by suitable motion transmitting means, as schematically illustrated by 406, to a valve assembly 408 which is serially connected between conduit 410, leading from conduit 164, and conduit 412, leading to conduit 182. Generally, the valve assembly 408 functions in a manner whereby a reduction in flow through the valve assembly 408 is experienced as probe 404 senses an increase in temperature.

FIG. 8 illustrates in greater detail one embodiment of a probe 404 and valve assembly 408 suitable for use in the arrangement of FIG. 7. Valve assembly 408 is illustrated as being comprised of a housing 414 having an inlet conduit 416 and an outlet conduit 418 generally between which is situated a valve orifice and seat 420. A valve member 422, carried as at the end of a stem portion 424, is situated so as to vary the effective area of orifice 420 depending on the relative proximity of the valve member 422. Stem 424, provided with a shoulder-like pilot portion 426 slidably received within a cylindrical guide-way 428 formed in housing 414, has its opposite end operatively secured to one end of a temperature sensing rod 430. The other end of rod 430 is secured to an end cap member 432 which cooperates with a recessed portion of housing 414 to axially contain therebetween a second temperature sensing member 434 of cylindrical configuration. Cylinder 434 and rod 430 have different coefficients of thermal expansion resulting in a predictable axial movement of valve member 422 per degree of temperature variation. The temperature probe 404 is also preferably provided with a protective shroud 436, which is perforated as at 438, in order to protect the rod 430 and cylinder 434 from possible damage. The entire assembly may be secured to the housing 14 of engine 400 by any suitable means such as the screw and seal respectively illustrated at 440 and 442.

The fuel control 12 of FIG. 7 has been shown in complete detail in FIG. 1 and therefore its operation will not again be described. Basically, the purpose of the temperature controlled valve assembly 408 is to modify the fuel flow passing through metering orifice 162 in accordance with temperature. As has been previously stated, the temperature probe 404 is effective for reducing the fuel flow through valving assembly 408 as the probe 404 senses an increase in burner inlet temperature.

Referring to each of FIGS. 7, 8 and 1, it can be seen that metered fuel at a pressure $P_4$ is delivered to conduit 164 from where it flows through conduit 410 to the valve assembly 408 and passes through the effective flow area of orifice 420, as determined by the degree of closure of valve portion 422, exiting out of conduit 418 at some lesser pressure $P_8$ and from there flowing to conduit 182 via conduit 412.

The operation, in all respects, of fuel control 12 of FIG. 7 is as that of the fuel control 12 of FIG. 1 except that now valve assembly 408 creates a second pressure drop of $P_4$–$P_7$ across orifice 420. For example, as the engine is accelerated from one point of steady state operation to a second point of steady state operation, the temperature of the exhaust gases from turbine 26 increases causing the regenerator 402 to transfer more heat to the air passing from the compressor 24 to the burner 20. Consequently, as temperature probe 404 senses the increase in temperature of the air being directed to burner 20, valve 422 is moved to a position further restricting the flow of fuel through orifice 420 and valve assembly 408. However, it should be remembered that the function of the pressure differential of $P_2$–$P_4$ as discussed with reference to FIG. 1 is now replaced by the overall pressure differential of $P_2$–$P_8$ with the use of a flow modifying temperature responsive valving assembly such as 408. The resulting operation, however, is functionally equivalent. That is the relationship of fuel flow, $W_f$, to compressor discharge pressure, $P_{t3}$, is still substantially linear as characteristically graphically illustrated in FIG. 9 wherein the limits of a "cold" regenerator and a "hot" regenerator define an area wherein a family of generally linear fuel-flow-to-compressor-discharge-pressure schedules will exist depending upon the then particular temperature of the regenerator.

Even though the temperature probe 404 has been illustrated as being employed at a point immediately upstream of the burner 20, it should be apparent, in view of the preceding description, that the probe 404 could be employed by positioning it in proximity to the turbine 26 so as to sense the temperature of the exhaust gases or any other operating temperature. This is possible because, the basic function of the probe 404 is to sense, in terms of temperature, the useful heat energy remaining within the exhaust gases after such gases have performed the primary function of driving the turbine wheel or wheels, as the case may be. Such a determination then can be employed for calculating, as through the various computing systems of the fuel control, the amount of fuel needed to be supplied to raise the temperature of air within the burner to a desired heat level.

Further, it should be evident that the fuel controls illustrated by any of FIG. 1, 5 or 7 could be employed in combination either of the class of turbine engines shown in FIGS. 1 and 5 and that each of such fuel controls as shown by FIG. 1, 5 or 7 may be modified in accordance with the teachings of FIG. 6 in order to assure proper performance when employed in combination with a free-shaft or split-shaft type turbine engine.

Although only selected preferred embodiments and modifications of the invention have been disclosed and described, it is apparent that other embodiments and modifications of the invention are possible within the scope of the appended claims.

I claim:

1. A turbine engine fuel control, comprising a housing, a fuel inlet in said housing, a metered fuel outlet in said housing, first means for metering fuel to said engine, second means adapted to be responsive to the speed of said engine, third means for creating an output signal indicative of requested engine output power, fourth means for bypassing unmetered fuel around said first means and returning said unmetered fuel to an associated fuel supply system, fifth means responsive to a pressure related to and derived by compressor discharge pressure constantly flowing to atmosphere through a series arrangement of a pair of fixed restrictions throughout the fuel operating range of the engine for tending to close said fourth means in order to thereby reduce the quantity of said unmetered fuel being returned to said associated fuel supply system when said compressor discharge pressure increases, said derived pressure being that pressure existing between said series restrictions, said series restrictions being of a design such that said derived pressure is a function of compressor discharge pressure, and sixth means responsive to a pressure differential existing across said first fuel metering means for tending to open said fourth means in order to thereby increase the quantity of said unmetered fuel being returned to said associated fuel supply system when said pressure differential increases, said pressure differential across said first fuel metering means being a function of metered fuel flow, said third means being effective for causing said first fuel-metering means to reduce the rate of metered fuel being supplied to said engine when a lesser engine power output is requested and also being effective to cause said first fuel-metering means to increase the rate of metered fuel being supplied to said engine when a greater engine power is requested, said second means also being effective to cause said first fuel-metering means to reduce the rate of metered fuel being supplied to said engine as the speed of said engine approaches a preselected engine speed, and said sixth means being effective to at least partially open said fourth means and thereby return a controlled amount of said unmetered fuel to said associated fuel supply system when said engine is operating at said preselected engine speed.

2. A turbine engine fuel control according to claim 1 including seventh means responsive to the heat content of a gas at a selected location within said engine to diminish the rate of metered fuel flowing to said engine from said first fuel-metering means generally in accordance with an increase in the degree of heat content of said gas.

3. A turbine engine fuel control according to claim 1 including shut-off valve means for positively terminating any further flow of fuel to said engine whenever said third means creates an input signal indicative of a request of no engine output power.

4. A turbine engine fuel control according to claim 1 including pressure responsive valve means for preventing the flow of any fuel to said engine until the pressure of said unmetered fuel first attains a predetermined minimum pressure.

5. A turbine engine fuel control according to claim 1 wherein said first means for metering fuel to said engine comprises, a metering orifice, a metering valving element including a body portion variably positionable with respect to said metering orifice in order to vary the rate of fuel metered through said metering orifice, wherein said third means for creating an input signal indicative of requested engine output power comprises motion transmitting means effective for resiliently biasing said metering valving element and body portion in a direction which would normally increase the effective metering area of said metering orifice, and wherein said second means adapted to be responsive to the speed of said engine comprises pressure responsive means operatively connected to said valving element and exposed to a source of variable pressure the magnitude of which is reflective of engine speed for urging said valving element and body portion with a force dependent on engine speed in a direction which would normally decrease the effective metering area of said metering orifice.

6. A turbine engine fuel control according to claim 5 wherein said metering valving element and body portion comprise a generally cylindrical body axially slidable within a cooperating guideway carried within said housing; wherein said motion transmitting means effective for resiliently biasing said metering valving element and body portion comprises a variably positionable cam member operatively engageable with an associated lever member; said cam member being effective to rotate said lever member in a direction causing said lever member to urge said valving element and body portion, through an intermediate spring operatively connected to said body portion, in a direction away from said metering orifice in order to permit a greater rate of fuel flow therethrough to said engine whenever an increase in engine output power is requested; and wherein said pressure responsive means comprises a wall member operatively connected to said valving body portion and movable in response to a pressure differential created thereacross which pressure differential is a function of the speed of said engine; said pressure differential being effective to move said wall member and said valving element and body portion toward said metering orifice whenever said engine approaches a speed indicative of the attaintment of the requested engine output power.

7. A turbine engine fuel control according to claim 5 wherein said metering valving element and body portion comprise a generally cylindrical body axially slidable within a cooperating generally cylindrical guideway carried within said housing; including first positive stop means for establishing a first limit to which said valving element may be moved toward said metering orifice and second positive stop means for establishing a second limit to which said valving element may be moved away from said metering orifice; wherein said motion transmitting means comprises a variably positionable cam member, a pivotally supported lever member adapted for engagement with said cam member, and a spring operatively connected to said valving element and body portion; said cam member being effective to cause said lever to rotate and forcibly engage and tend to compress said spring so as to urge said valving element and body portion in a direction away from said metering orifice in order to permit a greater rate of fuel flow therethrough to said engine whenever an increase in engine output power is requested; and wherein said pressure responsive means comprises a movable diaphragm operatively connected to said valving element and body portion and to said spring; said diaphragm being exposed to a pressure differential thereacross indicative of the speed of said engine; said pressure differential being effective, upon increases in engine speed, to urge said valving element and body portion against the action of said spring so as to at least tend to move said valving element and body portion toward said metering orifice in order to reduce the rate of fuel flow therethrough as the speed of said engine approaches a speed indicative of said engine attaining the requested engine output power.

8. A turbine engine fuel control according to claim 1 wherein said first means for metering fuel to said engine comprises, a metering orifice, a metering valve variably positionable with respect to said metering orifice in order to vary the rate of fuel metered through said metering orifice, wherein said third means for creating an input signal indicative of requested engine output power comprises first motion transmitting means effective for resiliently biasing said metering valve in a direction which would normally increase the effective metering area of said metering orifice, wherein said second means adapted to be responsive to the speed of said engine comprises first pressure responsive means operatively connected to said metering valve and exposed to a source of variable pressure the magnitude of which is reflective of engine speed for urging said valving element and body portion with a force dependent on the speed of said engine in a direction which would normally decrease the effective metering area of said metering orifice, wherein said fourth means comprises a bypass valve and cooperating valve seat, and bypass conduit means, wherein said fifth means comprises second pressure responsive means exposed to a pressure indicative of engine compressor discharge pressure, including second motion transmitting means operatively interconnecting said second pressure responsive means and said bypass valve thereby enabling said second pressure responsive means to urge said bypass valve toward said cooperating valve seat as said second pressure responsive means senses an increase in the magnitude of said engine compressor discharge pressure, and wherein said sixth means comprises third pressure responsive means operatively connected to said bypass valve and exposed to a pressure differential existing across said metering orifice, said third pressure responsive being effective to urge said bypass valve away from said cooperating seat as said third pressure responsive means senses an increase in the magnitude of said pressure differential across said metering orifice.

9. A turbine engine fuel control according to claim 1 wherein said fifth means responsive to engine compressor discharge pressure comprises a housing portion having a general chamber formed therein, a pressure responsive diaphragm member situated within said general chamber in a manner defining first and second variable and distinct chambers, a first conduit portion formed in said housing portion and adapted for communication with a source of said engine compressor discharge pressure, a first fixed restriction communicating between said first conduit portion and said first chamber, a second conduit portion formed in said housing portion and communicating between said first chamber and a source of atmospheric pressure, a second fixed restriction within said second conduit portion, a third conduit portion communicating between said second chamber and said second conduit portion at a point between said second restriction and said source of atmospheric pressure, a spring within said second chamber normally urging said diaphragm member toward said first chamber, and a motion transmitting member operatively connected to said diaphragm member, said motion transmitting member being effective to transmit a force to said fourth means for decreasing the quantity of unmetered fuel returned to said associated fuel supply system.

10. A turbine engine fuel control according to claim 9 wherein said fourth means comprises a variably positionable bypass valve, a bypass conduit adapted to communicate with said associated fuel supply system, a bypass orifice and valve seat adapted to communicate between a source of unmetered fuel and said bypass conduit, wherein said sixth means comprises a second general chamber formed in said housing portion, a second pressure responsive diaphragm member operatively connected to said bypass valve and situated within said second general chamber in a manner defining third and fourth variable but distinct chambers, a fourth conduit portion communicating between said third chamber and a source of metered fuel pressure, fifth conduit means communicating between said fourth chamber and a source of unmetered fuel pressure, a second spring situated within said third chamber and operatively engaging said second pressure responsive diaphragm member, and a variably positionable spring seat engaging said second spring so as to generally confine said second spring between said spring seat and said second pressure responsive diaphragm member, said motion transmitting member being effective to at times cause said spring seat to be forced toward said second pressure responsive diaphragm member whenever said engine compressor discharge pressure as sensed by said pressure responsive diaphragm between said first and second chambers indicates that said bypass valve should be urged toward said valve seat in order to reduce the quantity of unmetered fuel being returned to said associated fuel supply system.

11. A turbine engine fuel control according to claim 1 wherein said fifth means responsive to engine compressor discharge pressure comprises a housing portion having a general chamber formed therein, a pressure responsive diaphragm member situated within said general chamber in a manner defining first and second distinct but variable chambers, conduit means effective for completing communication between said first chamber and a source of said engine compressor discharge pressure and effective for completing communication between said first chamber and a source of atmospheric pressure, fixed restriction means within said conduit means for causing said first chamber to be at a pressure which is only a portion of the said compressor discharge pressure, fixed vent means effective for venting said second chamber to said source of atmospheric pressure, a spring within said second chamber normally urging said diaphragm member toward said first chamber, and a motion transmitting member operatively connected to said diaphragm member, said motion transmitting member being effective to transmit a force to said fourth means for decreasing the quantity of unmetered fuel returned to said associated fuel supply system.

References Cited

UNITED STATES PATENTS

| 3,078,669 | 2/1963 | Williams | 60—39.28 |
| 3,243,957 | 4/1966 | Mansfield | 60—39.28 |
| 3,283,503 | 4/1966 | Cowles | 60—39.28 |
| 3,240,015 | 3/1966 | Cowles | 60—39.28 |

MARK M. NEWMAN, Primary Examiner

U.S. Cl. X.R.

60—39.16, 39.51